United States Patent
Gutta et al.

(10) Patent No.: US 12,386,874 B2
(45) Date of Patent: *Aug. 12, 2025

(54) DATABASE GENERATION FROM NATURAL LANGUAGE TEXT DOCUMENTS

(71) Applicant: DSilo Inc., New York, NY (US)

(72) Inventors: Jaya Prakash Narayana Gutta, New York, NY (US); Sharad Malhautra, New York, NY (US); Lalit Gupta, Bangalore (IN)

(73) Assignee: DSilo Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,529

(22) Filed: Apr. 25, 2024

(65) Prior Publication Data

US 2024/0273124 A1     Aug. 15, 2024

Related U.S. Application Data

(63) Continuation of application No. 18/108,116, filed on Feb. 10, 2023, now Pat. No. 12,072,917, which is a
(Continued)

(51) Int. Cl.
*G06F 16/334* (2025.01)
*G06F 16/31* (2019.01)
(Continued)

(52) U.S. Cl.
CPC .......... *G06F 16/3344* (2019.01); *G06F 16/31* (2019.01); *G06F 16/3347* (2019.01);
(Continued)

(58) Field of Classification Search
CPC .... G06F 16/334; G06F 16/3347; G06F 16/31; G06F 16/355; G06F 40/279; G06F 40/186; G06F 40/295; G06N 20/20; G06Q 50/18
See application file for complete search history.

(56) References Cited

U.S. PATENT DOCUMENTS 9,280,908 B2   3/2016   Isensee et al.
10,558,759 B1 *   2/2020   Arfa ........................ G06F 40/30
(Continued)

OTHER PUBLICATIONS

Wang et al. Nov. 2018, "GLUE: A Multi-Task Benchmark and Analysis Platform for Natural Language Understanding" (Year: 2018).*

Christidis et al. May 10, 2016, "Blockchains and Smart Contracts for the Internet of Things". (Year: 2016).*

(Continued)

*Primary Examiner* — Matthew J Ellis
(74) *Attorney, Agent, or Firm* — Pillsbury Winthrop Shaw Pittman LLP

(57) ABSTRACT

Some embodiments may perform operations of a process that includes obtaining a natural language text document and use a machine learning model to generate a set of attributes based on a set of machine-learning-model-generated classifications in the document. The process may include performing hierarchical data extraction operations to populate the attributes, where different machine learning models may be used in sequence. The process may include using a pre-trained Bidirectional Encoder Representations from Transformers (BERT) model augmented with a pooling operation to determine a BERT output via a multi-channel transformer model to generate vectors on a per-sentence level or other per-text-section level. The process may include using a finer-grain model to extract quantitative or categorical values of interest, where the context of the per-sentence level may be retained for the finer-grain model.

14 Claims, 7 Drawing Sheets

Related U.S. Application Data continuation of application No. 17/877,321, filed on Jul. 29, 2022, now Pat. No. 11,580,150.

(60) Provisional application No. 63/227,793, filed on Jul. 30, 2021, provisional application No. 63/227,796, filed on Jul. 30, 2021, provisional application No. 63/227,790, filed on Jul. 30, 2021.

(51) Int. Cl.
| | | |
|---|---|---|
| *G06F 16/355* | (2025.01) | |
| *G06F 40/186* | (2020.01) | |
| *G06F 40/279* | (2020.01) | |
| *G06F 40/295* | (2020.01) | |
| *G06N 20/20* | (2019.01) | |
| *G06Q 50/18* | (2012.01) | |

(52) U.S. Cl.
CPC .......... *G06F 16/355* (2019.01); *G06F 40/186* (2020.01); *G06F 40/279* (2020.01); *G06F 40/295* (2020.01); *G06N 20/20* (2019.01); *G06Q 50/18* (2013.01)

(56) References Cited

U.S. PATENT DOCUMENTS

| | | | |
|---|---|---|---|
| 11,243,944 B2 | 2/2022 | Zhang et al. | |
| 11,423,068 B2* | 8/2022 | Faruqui | G06N 3/045 |
| 11,544,590 B2 | 1/2023 | Kim | |
| 11,720,615 B2 | 8/2023 | Gutta et al. | |
| 11,880,658 B2 | 1/2024 | Balasubramanian et al. | |
| 11,886,233 B2 | 1/2024 | Kim et al. | |
| 2006/0074900 A1* | 4/2006 | Nanavati | G06F 16/3331 |
| | | | 707/999.005 |
| 2011/0320498 A1* | 12/2011 | Flor | G06F 16/28 |
| | | | 707/E17.087 |
| 2020/0034611 A1 | 1/2020 | Hosabettu et al. | |
| 2020/0294133 A1* | 9/2020 | Cella | G06V 10/762 |
| 2021/0056150 A1 | 2/2021 | Karandish et al. | |
| 2021/0081503 A1 | 3/2021 | Tran et al. | |
| 2021/0109995 A1* | 4/2021 | Mihindukulasooriya | |
| | | | G06F 40/247 |
| 2021/0294970 A1* | 9/2021 | Bender | G06F 16/3329 |
| 2021/0295822 A1* | 9/2021 | Tomkins | G06F 16/3338 |
| 2021/0342847 A1* | 11/2021 | Shachar | G06Q 20/4016 |
| 2022/0043972 A1 | 2/2022 | Nishida et al. | |
| 2022/0188885 A1 | 6/2022 | Blackman et al. | |
| 2023/0034414 A1 | 2/2023 | Osugi et al. | |
| 2023/0037077 A1* | 2/2023 | Gutta | G06N 20/20 |
| 2023/0315770 A1 | 10/2023 | Gutta et al. | |

OTHER PUBLICATIONS

Clack et al. "Smart Contract Templates: Foundations, Design Landscape and Research directions" Mar. 15, 2017. (Year: 2017).*

Non-Final Office Action in related U.S. Appl. No. 18/108,116, dated Aug. 23, 2023, pp. 1-32.

Notice of Allowance in related U.S. Appl. No. 18/108,116, dated Jan. 24, 2024, pp. 1-33.

Notice of Allowance in related U.S. Appl. No. 18/108,116, dated Mar. 5, 2024, pp. 1-13.

Non-Final Office Action in related U.S. Appl. No. 18/331,655 dated Jul. 18, 2024, pp. 1-26.

Notice of Allowance in related U.S. Appl. No. 18/331,655 dated Jan. 28, 2025, pp. 1-11.

Maximilian Wohrer et al., Domain Specific Language for Smart Contract Development, May 1, 2020, IEEE International Conference on Blockchain and Cryptocurrency, pp. 1-9 (Year: 2020).

Emanuel Regnath et al., SmaCoNat: Smart Contracts in Natural Language, Sep. 1, 2018, Forum on Specification and Design Language, pp. 1-8 (Year: 2018).

Non-Final Office Action in related U.S. Appl. No. 18/473,939 dated Apr. 24, 2024, pp. 1-29.

Notice of Allowance in related U.S. Appl. No. 18/473,939 dated Jul. 12, 2024, pp. 1-13.

* cited by examiner

DATABASE GENERATION FROM NATURAL LANGUAGE TEXT DOCUMENTS

RELATED APPLICATIONS

This application is a continuation of U.S. patent application Ser. No. 18/108,116 filed Feb. 10, 2023 and titled "DATABASE GENERATION FROM NATURAL LANGUAGE TEXT DOCUMENTS", which is a continuation of U.S. patent application Ser. No. 17/877,321 filed Jul. 29, 2022 and titled "DATABASE GENERATION FROM NATURAL LANGUAGE TEXT DOCUMENTS" now U.S. Pat. No. 11,580,150, which claims benefit of U.S. Provisional Patent Application No. 63/227,793 filed Jul. 30, 2021 and titled "DATABASE GENERATION FROM NATURAL LANGUAGE TEXT DOCUMENTS", U.S. Provisional Patent Application No. 63/227,790 filed Jul. 30, 2021 and titled "DATABASE QUERY GENERATION USING NATURAL LANGUAGE TEXT", and U.S. Provisional Patent Application No. 63/227,796 filed Jul. 30, 2021 and titled "SELF-EXECUTING PROTOCOL GENERATION FROM NATURAL LANGUAGE TEXT", the entireties of which are each hereby incorporated by reference.

This application is related to U.S. patent application Ser. No. 17/877,365 filed Jul. 29, 2022 and titled "DATABASE QUERY GENERATION USING NATURAL LANGUAGE TEXT" (issued as U.S. Pat. No. 11,520,815 on Dec. 6, 2022), co-pending U.S. patent application Ser. No. 18/073,815 filed Dec. 2, 2022 and titled "DATABASE QUERY GENERATION USING NATURAL LANGUAGE TEXT", and co-pending U.S. patent application Ser. No. 17/877,264 filed Jul. 29, 2022 and titled "SELF-EXECUTING PROTOCOL GENERATION FROM NATURAL LANGUAGE TEXT", the entireties of which are each hereby incorporated by reference.

BACKGROUND

Natural language processing includes techniques usable to process documents and discern meaning from the documents. Applications often employ natural language processing techniques to perform document processing tasks, such as translation, information extraction, summarization, text generation, or document assessment. Natural language processing often includes training a model to analyze natural language text and employing the trained model to determine one or more results based on the natural language text.

SUMMARY

The following is a non-exhaustive listing of some aspects of the present techniques. These and other aspects are described in the following disclosure.

Provided in some embodiments are techniques that include methods and systems for discerning information from text documents. In some embodiments, an artificial intelligence (AI) model, such as a deep learning type of machine learning model, is employed to generate a set of attributes of a natural language text document based on a set of machine-learning-model-generated classifications of the document. The process may include, for example, using different deep learning models in sequence to perform hierarchical data extraction operations to populate attributes. In some embodiments, the process includes using a multi-channel transformer model. For example, the process may include using a multi-channel transformer model, such as a pre-trained Bidirectional Encoder Representations from Transformers (BERT) model augmented with a pooling operation to determine a BERT output to generate vectors on a per-sentence level or other per-text-section level. A finer-grain model may, for example, be used to extract quantitative or categorical values of interest, where the context of the per-sentence level may be retained for the finer-grain model.

Provided in some embodiments is a tangible, non-transitory, machine-readable medium storing instructions that are executable by a data processing apparatus to cause a data processing apparatus to perform operations described herein, such as those described above.

Provided in some embodiments is a system, including one or more processors and memory storing instructions that are executable by a data processing apparatus to cause a data processing apparatus to perform operations described here, such as those described above.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
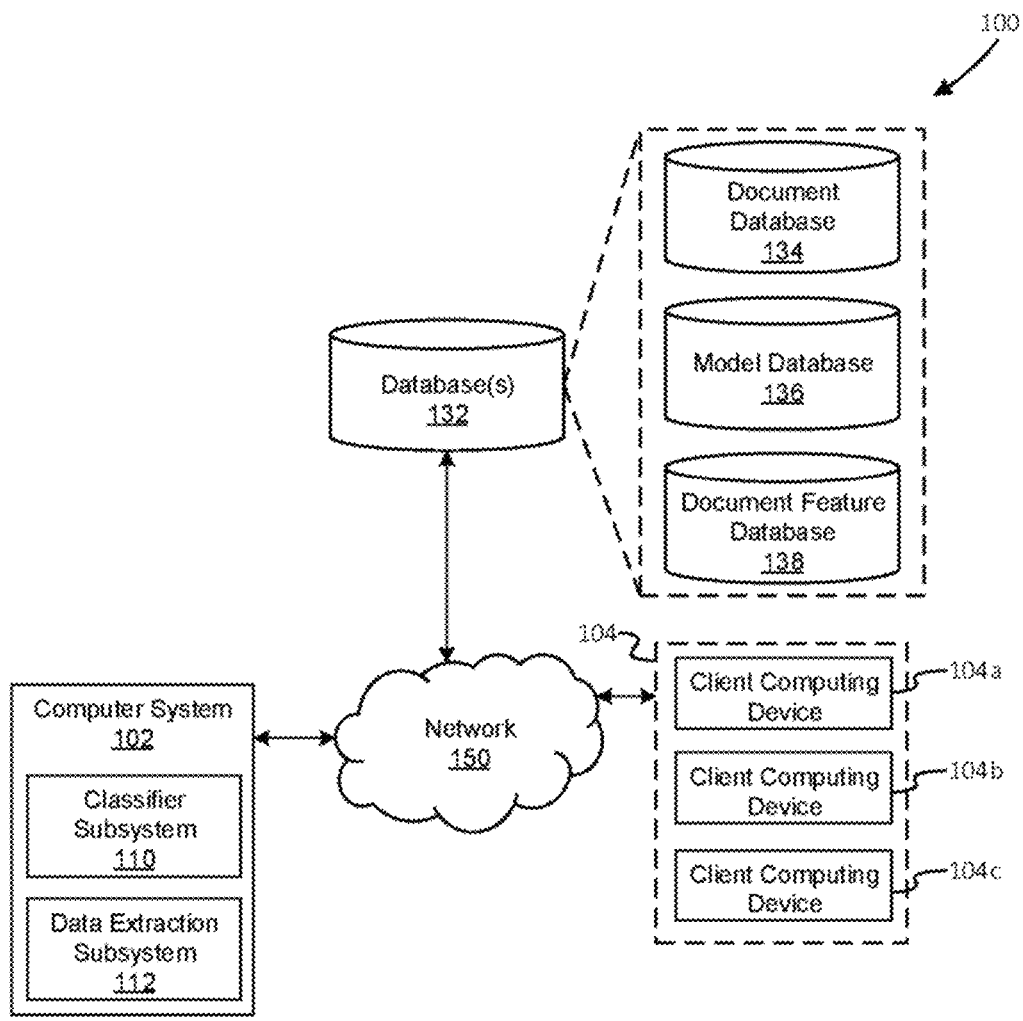
FIG. 1 is a schematic diagram that illustrates a first computing environment in accordance with one or more embodiments of the present technique.

While the present techniques are susceptible to various modifications and alternative forms, specific embodiments are shown by way of example in the drawings and are described in detail. The drawings may not be to scale. The drawings and detailed description are not intended to limit the present techniques to the particular form described, but are intended to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, some embodiments are problem-specific, and not all embodiments address every problem with traditional systems described herein or provide every benefit described herein. That said, improvements that solve various permutations of these problems are described below.

Information stored in unstructured natural language text is often stored in database systems to increase data retrieval efficiency and to provide for cross-document analysis of data stored in unstructured documents. Unfortunately, the conversion of this information into database values is often tedious and difficult due to the variations in terminology, document structure, and priorities of the documents. Changes in database table sizes, misalignments in characters, spelling errors, or the use of unconventional terminology often results in failed or incorrect interpretations of values. These and other challenges often frustrate operations attempting to correctly extract values from a set of documents.

As described herein, certain embodiments provide perform operations to extract information from a document using a set of artificial intelligence (AI) learning models (or "learning models"), such as deep learning models or other machine learning models, and to store the information in a structured database. The information may be prioritized based on predefined or dynamically defined categories. In some embodiments, training the set of learning models may include using self-learning models or semi-automated learning models. Some embodiments may further train one or more learning models to store the extracted information in a structure that is organized based on the document. Furthermore, some embodiments may use the set of learning models in a hierarchical arrangement and further dynamically structure a user interface associated with model training to increase training efficiency.

Example Systems

FIG. 1 is a schematic diagram that illustrates a first computing environment (or "system") 100 in accordance with one or more embodiments. In the illustrated embodiment, the system 100 includes a computer system 102 (e.g., including a classifier subsystem 110 and a data extraction subsystem 112), a set of user devices 104 (e.g., including user devices 104a-104c) and databases 132 (e.g., including document databases 134, a model database 136 and a document feature database 138) communicatively coupled by way of a network 150.

Although certain embodiments are described herein as being performed by particular components of computer system 102 for the sake of example, some or all of those operations may, in some embodiments, be performed by other components of computer system 102 or other components of system 100. As an example, while one or more operations are described herein as being performed by components of the computer system 102, those operations may, in some embodiments, be performed by components of the set of user devices 104. Various instructions, messages, or other sets of values may be communicated between components of the system 100 via a network 150.

In some embodiments, the user devices 104 are mobile or fixed terminals. For example, the user devices 104a-104c may each be a desktop computer, a notebook computer, a tablet computer, a smartphone, a wearable device, or another user device. Users may, for example, utilize one or more user devices 104a-104c to interact with one another, with one or more servers, or with other components of system 100.

In some embodiments, data is obtained from one or more databases 132 for training or use by a set of AI learning models (e.g., deep learning models or other types of machine learning models) to process documents. Machine learning models may be a type of AI learning models, and deep learning models may, for example, be a type of machine model that employs a neural network with multiple layers (which may include one or more hidden layers). Although certain embodiments are described as employing one or more deep learning models for the purpose of illustrations, certain embodiments may employ other suitable types of models, such as other AI and machine learning models. Training operations for a deep learning model may include, for example, obtaining corpora from a document database 134 and using the corpora to determine model parameters for the deep learning model. The model parameters determined may then be stored in the model database 136 and retrieved for use in classifying a document or determining document feature values (or "field values"), which may be stored in the document feature database 138. In some embodiments, a set of document features (or "fields") for a document are retrieved from a document feature database 138 based on a set of categories assigned to the document.

In some embodiments, the classifier subsystem 110 is employed to classify a document and the data extraction subsystem 112 is used to determine features and values of features contained in a document. For example, the classifier subsystem 110 may use a first set of model parameters from the model database 136 for a first deep learning model to classify a document to determine a set of document features of a document, and the data extraction subsystem 112 may use a second set of model parameters from the model database 136 for a second deep learning model to determine values associated with the document features. In some embodiments, the first deep learning model is different from the second deep learning model. For example, the classifier subsystem 110 may use a Naïve Bayes classifier to assign a first document type (or "category") to a document (where the first document type category is associated with a corresponding set of document features) and the data extraction subsystem 112 may then use the corresponding set of document features in conjunction with the text of the document to determine a set of document feature values using a multi-channel transformer model, such as a dual BERT model or a Siamese BERT model. In some embodiments, the set of document feature values are stored in the database(s) 132 or some other datastore.

Figure 2:
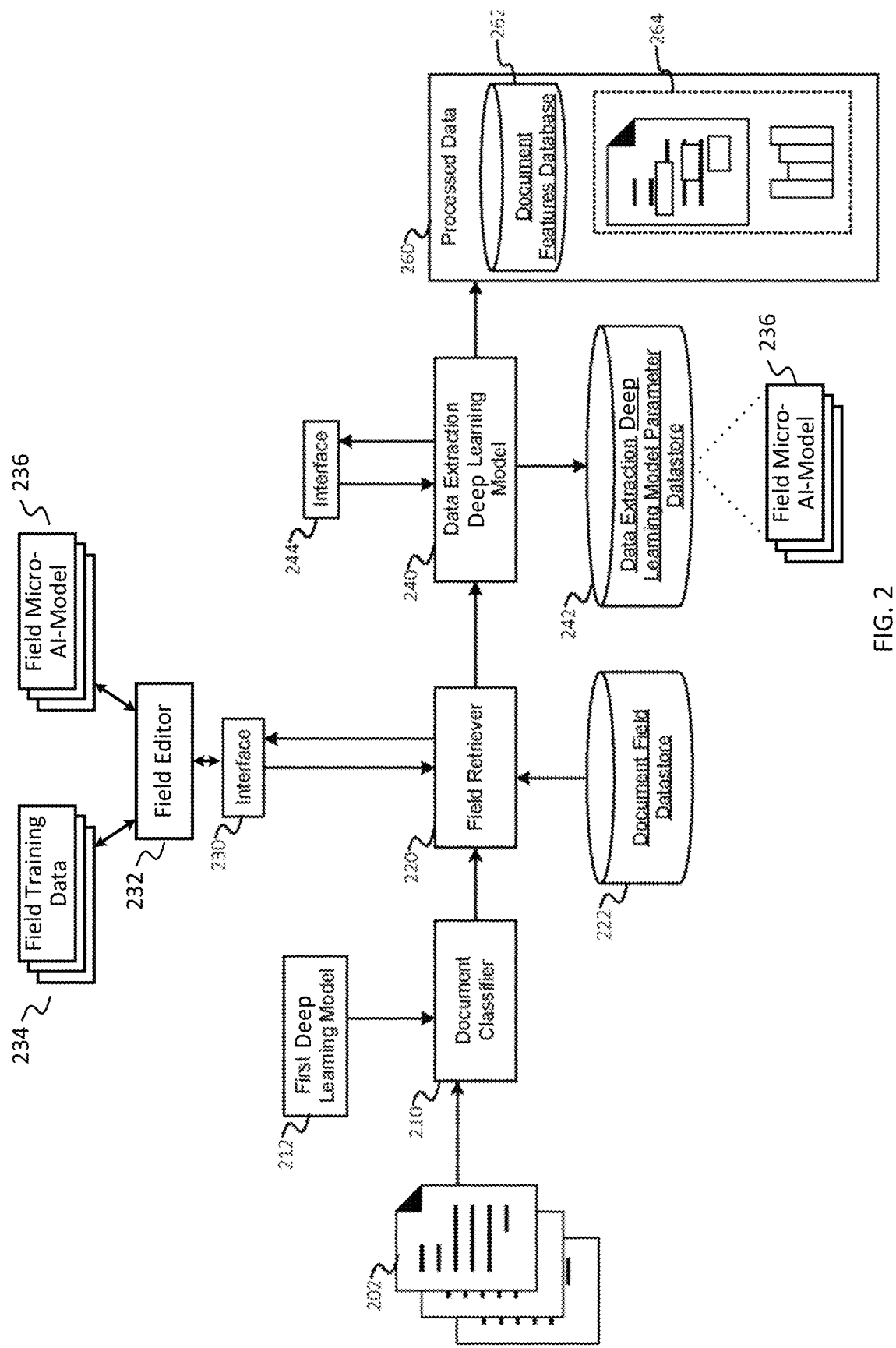
FIG. 2 is a diagram that includes a logic-and-physical-architecture system in accordance with one or more embodiments of the present technique.

FIG. 2 is a diagram that includes a logic-and-physical-architecture system 200 in accordance with one or more embodiments. The logic-and-physical-architecture system 200 may be employed, for example, to provide a database language query based on an obtained natural language question. In the illustrated embodiment, the architecture system 200 includes document(s) 202, a document classifier 210, a first deep learning model 212, a document feature retriever (or "field retriever") 220, a document field datastore 222, a "field" interface 230, a second deep learning model (or "data extraction deep learning model") 240, a model parameter repository (or "data extraction deep learning model parameter datastore") 242, an "extraction" interface 244. In some embodiments, the system 200 is employed to classify (or "categorize") documents, to determine document features based on the classifications, and to extract corresponding feature values from the documents. In some embodiments, the document classifier 210 retrieves values from a deep learning model 212, where the deep learning model 212 is used for document classification. Each of the documents from the set of documents 202 may be classified and then provided to the document feature retriever 220.

After the document classifier 210 is trained, some embodiments may use the document classifier 210 to assign one or more document type categories to a document.

The document feature retriever 220 may retrieve fields of the document based on the classification performed by the document classifier 210. For example, some embodiments may classify a first document using the document classifier 210 to determine that the first document has a category of "contract." The document feature retriever 220 may determine fields based on data retrieved from a field datastore 222. The field datastore 222 may include records corresponding with different types of documents. For example, the field datastore 222 may include a first record having the title "shipment contracts—1.1" and a second record having the title "shipment contracts—appendix." The records of the field datastore 222 may have different record properties. For example, the record having the title "shipment contracts—1.1" may have an associated set of record properties such as "ship type," "ship color," and "container type," and the record having the title "shipment contracts—backup" may have an associated set of record properties such as "cost," "insured amount," and "tax."

In some embodiments, the document feature retriever 220 includes or otherwise access a deep learning model. Parameters of the deep learning model of the document feature retriever 220 may be used to dynamically determine document feature values based on the document type classifications determined using the document classifier 210. For example, some embodiments may provide a set of documents to a deep learning model of the field retriever 220 as inputs for a training operation, where formatting, spacing, changes in font, changes in color, or other visual indicators of documents may be detected and used as parts of the input for the training operation to determine one or more fields of a document.

Alternatively, or in addition, some embodiments may permit an interface 230 to edit the values of the retrieved fields obtained using the document feature retriever 220. For example, the interface 230 may employ a field editor 232 (e.g., graphic user interface) that permits a user to modify a set of retrieved fields. This may include, for example, editing retrieved fields, adding fields to the set of retrieved fields, or removing fields from the set of retrieved fields. After permitting a user to update may update one or more records in the document feature datastore 222 to reflect the modifications to the retrieved fields. For example, the field editor 232 may permit a user to use the interface 232 to select to modify the name of a field titled "blue" and modify the field by changing the name of a field titled "blue" to the string "Blues." In response, the field retriever 220 may update a record of the document feature datastore 222 to replace the value "blue" with "Blues." As described, the modifications of the retrieved fields may include adding a field and providing a corresponding model for the field (e.g., a field micro-artificial-intelligence-model (or "micro-ai-model") 236) or providing field training data (e.g., field training data 234) that can be used to generate or train a model (e.g., a micro-ai-model) associated with the newly added field. The modifications of the retrieved fields may include deleting fields. Examples of modifications to retrieved fields and the use of micro-ai-models are described herein with regard to at least FIGS. 5 and 6. Furthermore, during use of the field retriever 220, some embodiments may determine one or more fields of an input document, such as a document uploaded by a user, obtained from another server, obtained from the Internet, or the like.

After retrieving the set of fields using the document feature retriever 220, the extracted data may be processed by a second deep learning model 240. Some embodiments may train the second deep learning model 240 based on corpora and a plurality of document type categories associated with the corpora. For example, some embodiments may obtain a first document, a document type category, and a set of features for a document during training of the second deep learning model 240. In some embodiments, the document type categories used during a training operation for the second deep learning model 240 may be determined using the document classifier 210, and where the set of features may be determined using the second deep learning model 240. In some embodiments, a deep learning model (e.g., a micro-ai-model) is used to obtain vales for a specific feature (or "field"). For example, a first micro-ai-model 236 may be trained to extract values for the field "date" and a second micro-ai-model 236 may be trained to extract values for the field "days". In such an embodiments, where the document is classified as a category associated with the fields "date" and "days," the first-micro model 236 may be retrieved and employed by the data extraction model 240 to extract values of "date" (e.g., "1 Apr. 2022") from the text of the document, and the second-micro model 236 may be retrieved and employed by the data extraction model 240 to extract values of "day" (e.g., "5:00:00 pm") from the text of the document. As described, the extraction process may involve identifying sections most relevant to a given field, and applying a micro-ai-model for the given field to those most relevant section. This may include, for example, identifying ten sentences with relatively high scores for the field "date," and applying the micro-ai-model for the word "date" to those ten sentences to extract date values from those ten sentences. Examples of use of micro-ai-models to extract field values are described with regard to at least FIG. 6.

Some embodiments may populate model parameters of the second deep learning model 240 with values from the field retriever 220. Some embodiments may then store the extracted AI model parameters into the extracted model parameter repository 242. Some embodiments may permit a user or third-party system to use an interface 244 to modify values of the extracted model parameter repository 242. Alternatively, or in addition, some embodiments may store relationships between different deep learning models to indicate scores associated with different combinations of hierarchical arrangements of different layers of deep learning models. Processed data 260, such as document categories, features and feature values extracted, may be stored in a document features data 262. The processed data 260 may, for example, include documents generated based on the document categories, features and feature values extracted.

Example Training Operations

In some embodiments, a natural language processing (NLP) computer system, such as system 100, conducts operations for training a deep learning model, such as data extraction deep learning model 240, for natural language document information extraction.

In some embodiments, the deep model training operations include obtaining, by the NLP computer system, natural language document information including: (a) a category of a natural language document (e.g., a natural language document 202); (b) features (e.g., fields) associated with the natural language document; and (c) text of the natural language document (including values of the features associated with the natural language document). The category of the natural language document may, for example, be specified by a user or determined using a document classifier (e.g., as described herein with regard to determining categories of a document using a classifier subsystem 110). The features associated with the natural language document may, for example, be specified by a user or determined using a document field retriever (e.g., as described herein with regard to determining fields of a document using a document field retriever 220). The text of the natural language document may, for example, be provide by a user or another entity, or obtained from a database). In some embodiments, the natural language document information is provided by way of the field editor 232 for use in training "new" micro-ai-models for associated fields (or "terms"). For example, if the field retriever 230 presents the user with a list of extracted fields that include "date" and "time," but the user would like to include the field "company name," then the user may submit, by way of the field editor a request to add the field "company name" and provide corresponding field training data 234, such as training documents including samples of text that include values of company names, pre-identified values of company names, and the like. And, the field training data 234 may be employed in a training operation, such as those describe here, to determine a micro-ai-model for the field "company name."

In some embodiments, the deep model training operations include determining, by the NLP computer system using a transfer model, a transformer output including a set of hidden-state values, n-grams corresponding to the sequences of textual elements. Determining a transformer output including a set of hidden-state values, n-grams corresponding to the sequences of textual elements. This may include, for example, a directional encoder, such as a BERT model or dual BERT model, providing document feature values (e.g., field values) and document descriptions to first and second transformers, respectively, to generate first and second sets of hidden values, respectively, as described herein.

In some embodiments, the deep model training operations include conducting, by the NLP computer system, average pooling on the set of hidden-state values to generate a pooled output including a set of average-pooled hidden values. The average pooling on the set of hidden-state values to generate a pooled output including a set of average-pooled hidden values may include, for example, averaging performed on different sections of the set of hidden-state values to generate a pooled output including average-pooled sets of hidden values for the different sections. In some instances, first and second sets of hidden values of a dual BERT may be reduced using average pooling to generate first and second average-pooled sets of hidden values, respectively, for the first and second sets of hidden values, respectively.

In some embodiments, the deep model training operations include conducting, by the NLP computer system, concatenating of the average-pooled hidden values of the pooled output to generate a concatenated output including a set of hidden state values. The concatenating may include, for example, combining different hidden value states together (e.g., by way of average pooling and concatenation operations) into a single set of hidden state values.

In some embodiments, the deep model training operations include determining, by the NLP computer system based on the concatenated output, scores for sequences of elements of the natural language document for different features. Determining scores for sequences of elements of the natural language document for different features may include, for example, using fully-connected neural network layers to score n-grams such as phrases, sentences, or the like of the natural language document, where the score is indicative of the n-grams containing a feature value.

In some embodiments, the deep model training operations include selecting, by the NLP computer system based on the scores, a sequence of elements associated with a feature. Selecting a sequence of elements associated with a feature may include, for example, selecting n-grams such as phrases, sentences, or the like of the natural language document, associated with a score that satisfies a threshold feature value score.

In some embodiments, the deep model training operations include extracting, by the NLP computer system from the sequence of elements associated with the feature, a value of the feature. Extracting a value of the feature may include, for example, extracting a value of a feature (e.g., the field value of "24 Apr. 2021") using a deep learning model of the field retriever 220 as described here) [0039].

Example Information Extraction Operations

In some embodiments, a natural language processing (NLP) computer system, such as system 100, conducts operations for extracting information from a natural language document, such as an unstructured natural language document 202.

In some embodiments, the information extraction operations include obtaining, by the NLP computer system, an unstructured natural language document including text sections including sequences of textual elements. The textual elements may include, for example, words, phrases, or symbols.

In some embodiments, the information extraction operations include determining, by the NLP computer system, n-grams corresponding to the sequences of textual elements. In some embodiments, each n-gram includes a contiguous sequence of n items from a given sample of textual elements in the document. The n-grams may, for example, include blocks of relatively large textual units, such as words or relatively small textual units, such as syllables. As an example, in a document including the phrase "The contract effective date is 1 Mar. 2022", the phrase may be segmented into the following six 3-grams: "The contract effective", "contract effective date", "effective date is", "date is 1", "is 1 March" and "1 Mar. 2022").

In some embodiments, the information extraction operations include determining, by the NLP computer system, a count of the n-grams for the document. The count of the n-grams may be, for example, for each of different n-grams, a count of the number of times the n-gram appears in the sequences of textual elements of the document. Continuing with the prior example, if the n-gram "contract effective date" appears nine times in the document, the n-gram "contract effective date" may have a count of "9" for the document.

In some embodiments, the information extraction operations include determining, by the NLP computer system and based on the count of n-grams, a vector of the unstructured natural language document. The vector of the unstructured natural language document may, for example, be determined using term frequency-inverse document frequency (TF-IDF) scoring. In a vector representing the unstructured natural language document, each dimension of the vector may correspond to a separate term. The definition of term depends on the application. Terms may be defined, for example, as single words, keywords, or longer phrases. If words are chosen to be the terms, the dimensionality of the vector is the number of words in the vocabulary (the number of distinct words occurring in the corpus). If, for example, a term occurs in the document, its value in the vector is non-zero, and generally increases with the number of occurrences in the document. These vector values, also known as (term) weights, may be determined using, for example, TF-IDF weighting (or "scoring"). A TF-IDF weight (or "score") for a term may be a numerical statistic that is intended to reflect how important a word is to a document in a collection or corpus. A TF-IDF score for a term may, for example, be a product of a term frequency (TF) of the term within a document and an inverse document frequency (IDF) (e.g., TF-IDF score=TF*IDF). The term frequency (TF) of a term may be defined by the relative frequency of the term within document. The inverse document frequency (IDF) may be a measure of how much information the word provides, e.g., if it is common or rare across all documents in a collection or corpus. The inverse document frequency (IDF) may be defined as the logarithmically scaled inverse fraction of the documents that contain the word (obtained by dividing the total number of documents by the number of documents containing the term, and then taking the logarithm of that quotient).

In some embodiments, the information extraction operations include determining, by the NLP computer system and based on the vector using a first deep learning model (such as model 212), a category for the unstructured natural language document. The category for the unstructured natural language document may be, for example, a "real estate contract" category determined using the first deep learning model and a vector for the document. In such an embodiment, the first deep learning model may be used to determine that the vector for the document corresponds to the "real estate contract" category. The first deep learning model may be, for example, a Naïve Bayes classifier, a random forest classifier, or a logistic regression classifier.

In some embodiments, the information extraction operations include obtaining, by the NLP computer system in response to determining the category and from a database storing sets of document features associated with document categories, a set of document features (e.g., feature of document field datastore 222) associated with the category. The set of document features may include, for example, a predetermined set of features that are associated with the category. Continuing with the prior example of a real estate contract, the document features may include, for example, fields of "purchase date," "property address," "purchaser," "seller" and the like that are associated with the "real estate contract" category. The document features may include, for example, numbers, words, symbols, hyperlinks, images, other media, or the like. The document features for a category may be determined using a use a deep learning model, such as Siamese BERT model or triplet network model as described herein.

In some embodiments, the information extraction operations include determining, by the NLP computer system in response to determining the set of document features and using a second deep learning model (e.g., data extraction deep learning model 240), a score for a text section of the unstructured natural language document based on the set of features and text of the unstructured natural language document. The second deep learning model may be, for example, a multi-channel transformer model, such as a Siamese BERT or triple network model. In such an embodiment, determining the score may include (a) providing, to a first channel of the multi-channel transformer, the set of document features, and providing, to a second channel of the multi-channel transformer, textual elements of the unstructured natural language document, where the multi-channel transformer determines the score for text sections of the document based on the first channel processing the set of document features and the second channel processing the textual elements. For example, first a document may be passed to an NLP system (e.g., a classifier) that is employed to determine the category (e.g., "type") of the document. A second stage classifier may be employed to determine different sections of the document where relevant information may be present and to order these sections in the order of confidence scores. Continuing with the prior example of a real estate contract, where the text sections are broken into sentences within the document, the second deep learning model may calculate scores for each sentence text section of the document, including respective scores for sentences defining "purchase date," "property address," "purchaser," "seller", and so forth. In some embodiments, a micro-ai-model may be employed for extracting values for the features (or "fields"). For example, where the document is categorized as a real estate contract, and the fields of "purchase date," "property address," "purchaser," and "seller" are identified as fields for the real estate contract document, a separate micro-ai-model 236 for each of "purchase date," "property address," "purchaser," and "seller" may be applied to the text of the document to extract values for the respective fields.

In some embodiments, the information extraction operations include selecting, by the NLP computer system based on the score, the text section. In some embodiments, text sections having scores that satisfy a threshold are assessed for extraction of values of document feature. Continuing with the prior example of a real estate contract, where the sentences defining "purchase date," "property address," "purchaser," "seller", and so forth are assigned text section scores that satisfy (e.g., are above) a priority score threshold, the sentences may be provided to a finer-grain deep learning model (e.g., a respective micro-ai-model for a given feature) to determine a document feature value associated with a document feature. An example of a text section selection operation (e.g., using micro-ai-models) is described with regard to FIG. 6. The finer-grain deep learning model may be, for example, a transformer model, such as a Siamese BERT model.

In some embodiments, the information extraction operations include determining, by the NLP computer system based on the text section, a feature value. Continuing with the prior example of a real estate contract, this may include the finer-grain deep learning model assessing the sentences defining "purchase date," "property address," "purchaser," "seller", and so forth to determine respective values for "purchase date" (e.g., "1 Apr. 2022"), "property address" (e.g., "101 Main Street"), "purchaser" (e.g., "John Doe"), "seller" (e.g., "Jane Smith") and so forth).

In some embodiments, the information extraction operations include storing, by the NLP computer system in a database (e.g., document features database 262), the feature value(s) in association with the unstructured natural language document. Continuing with the prior example of a real estate contract, the respective values for the fields of "purchase date" (e.g., "1 Apr. 2022"), "property address" (e.g., "101 Main Street"), "purchaser" (e.g., "John Doe"), "seller" (e.g., "Jane Smith") and so forth, may be stored in a database in association with the real estate contract.

In some embodiments, the textual elements are words, the unstructured natural language document is a contract document outlining contract terms, and the feature values include numerical values for one or more of the contract terms. In such an embodiment, a second contract may be generated based on the numerical values for one or more of the contract terms. The second contract may be, for example, a self-executing contract including computer code defining the contract terms and configured to be executed to enforce the contract terms. In such an embodiment, generating the second contract may include generating (e.g., by the NLP computer system) the computer code defining the contract terms and storing, on a distributed ledger peer-to peer-network (e.g., a blockchain network). The computer code may include conditional statements defining the contract terms, and the computer code stored on the distributed ledger peer-to peer-network may be configured to be executed to enforce the conditional statements of the contract terms. For example, the contract may be a real-estate contract that specifies that a financial transaction (e.g., a monetary purchase payment from an escrow account of a buyer) be accomplished in response to the occurrence of a predefined event (e.g., in response to closing of a real estate transaction for the sale of a real estate property by a seller), and the computer code stored on the distributed ledger peer-to peer-network may be executed in response to the occurrence of a predefined event to accomplish the financial transaction (e.g., the computer code may monitor for the closing of the real estate transaction and, upon determining that the real estate transaction has closed, transfer monies for the purchase payment from the escrow account, into the sellers account).

Example Flowcharts

The processes presented in this disclosure are intended to be illustrative and non-limiting. In some embodiments, for example, the methods may be accomplished with one or more additional operations not described or without one or more of the operations discussed. Additionally, the order in which the processing operations of the methods are illustrated (and described below) is not intended to be limiting. In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for the execution of one or more of the operations of the methods.

In some embodiments, the computing environment 100 may execute one or more process routines described in this disclosure. In some embodiments, the various operations of the processes 300 or 400 may be executed in a different order, operations may be omitted, operations may be replicated, additional operations may be included, some operations may be performed concurrently, some operations may be performed sequentially, and multiple instances of the processes 300 or 400 may be executed concurrently, none of which is to suggest that any other description herein is limited to the arrangement described. In some embodiments, the operations of the processes 300 and 400 may be effectuated by executing program code stored in one or more instances of a machine-readable non-transitory medium, which in some cases may include storing different subsets of the instructions on different physical embodiments of the medium and executing those different subsets with different processors, an arrangement that is consistent with the use of the singular term "medium" herein.

Figure 3:
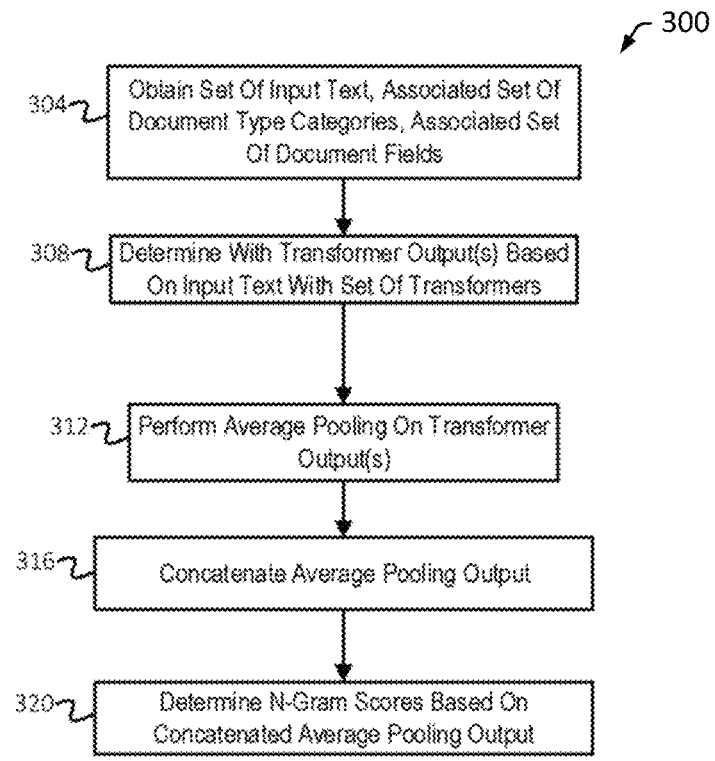
FIG. 3 is a flowchart diagram that illustrates a method of training a machine learning model for information extraction in accordance with one or more embodiments of the present technique.

FIG. 3 is a flowchart diagram that illustrates a method (or "process") 300 for training a deep learning model for information extraction in accordance with one or more embodiments of the present technique. In some embodiments, operations of the process 300 include obtaining a set of input text, an associated set of document type categories, or an associated set of document features, as indicated for block 304. The set of input text may be obtained from an upload performed by a user using a client computing device. In some embodiments, the associated set of document type categories are determined using a document classifier described elsewhere in this disclosure. Alternatively, or in addition, a category of the set of document type categories may be provided by the user during the upload or during a later update to metadata associated with the document. Furthermore, some embodiments may include obtaining an associated set of document features using a field retriever, where fields of the field retriever may be obtained from a document features datastore, as described elsewhere in this disclosure.

In some embodiments, operations of the process 300 include determining a set of one or more outputs based on the set of input text using a set of transformers, as indicated for block 308. As described elsewhere in this disclosure, some embodiments may use a transformer model to extract values from a document, where the transformer model may include a plurality of layers or may include multiple sets of layers. For example, some embodiments may use a directional encoders model such as a single BERT structure to determine a transformer output. Some embodiments may perform one or more preprocessing operations to the set of input text, such as lemmatizing, stemming, rooting, or the like. Some embodiments may convert in-vocabulary words of the input text into a list of tokens and split out-of-vocabulary words into a set of sub-words that are part of the vocabulary. Using the single BERT structure, some embodiments may generate three sets of values, such as a first matrix of values, a second matrix of values, and a third matrix of values, where the first matrix of values may represent a matrix of token values, the second matrix of values may represent a mask matrix, and the third matrix of values may represent sequence identifiers. Some embodiments may then provide the three sets of values to a transformer to obtain a final hidden-state.

Alternatively, or in addition, some embodiments may use a dual BERT model, where using a dual BERT model includes using two different transformers having a same composition but being trained with different inputs. For example, some embodiments may use a dual BERT structure by providing a first transformer with document feature values of a set of training documents and providing a second transformer with a corresponding set of document descriptions of the set of training documents. After being provided with the document feature values, the first transformer may provide a first tuple of three sets of values. Similarly, after being provided with the document descriptions, the second transformer may provide a second tuple of three sets of values. Some embodiments may then determine a corresponding first set of hidden values using the first transformer and a second set of hidden values using the second transformer.

Some embodiments may train a Siamese BERT architecture to extract data from a document. Using a Siamese BERT architecture may include concurrently providing document feature values and a corresponding set of document descriptions of the set of training documents to a Siamese BERT transformer. By using the Siamese BERT transformer, the same set of transformer model parameters may be used to determine a first set of hidden values and a second set of hidden values.

In some embodiments, operations of the process 300 include performing average pooling on the set of transformer outputs, as indicated for block 312. Some embodiments may perform average pooling by determining averages along different sections of the hidden states and using the averages as a set of average pooled outputs. In some embodiments, each set of the first and second set of hidden values of a dual BERT model may be reduced using average pooling into a corresponding first average-pooled set of hidden values and a corresponding second average-pooled set of hidden values.

In some embodiments, operations of the process 300 include concatenating the average pooling outputs, as indicated for block 316. Concatenating the average-pooled outputs may include combining different hidden state values together into a single set of hidden state values.

In some embodiments, operations of the process 300 include determining a set of scores based on the concatenated set of average-pooled outputs, as indicated for block 320. In some embodiments, such as for a dual BERT or Siamese BERT model, some embodiments may pass a concatenated set of hidden state values to a set of fully connected neural network layers. The output of the fully connected neural network layers may be a score assigned to a phrase, sentence, or another set of n-grams indicating a priority score of relevance. Some embodiments may then select one or more of the sets of n-grams based on the score to determine which set of n-grams to use to extract relevant information for a field. For example, some embodiments may assign a priority score of "0.99" to the sentence "Effective date→the contract will be valid from 24 Apr. 2021." Some embodiments may then obtain the date "24 Apr. 2021" from the sentence.

Figure 4:
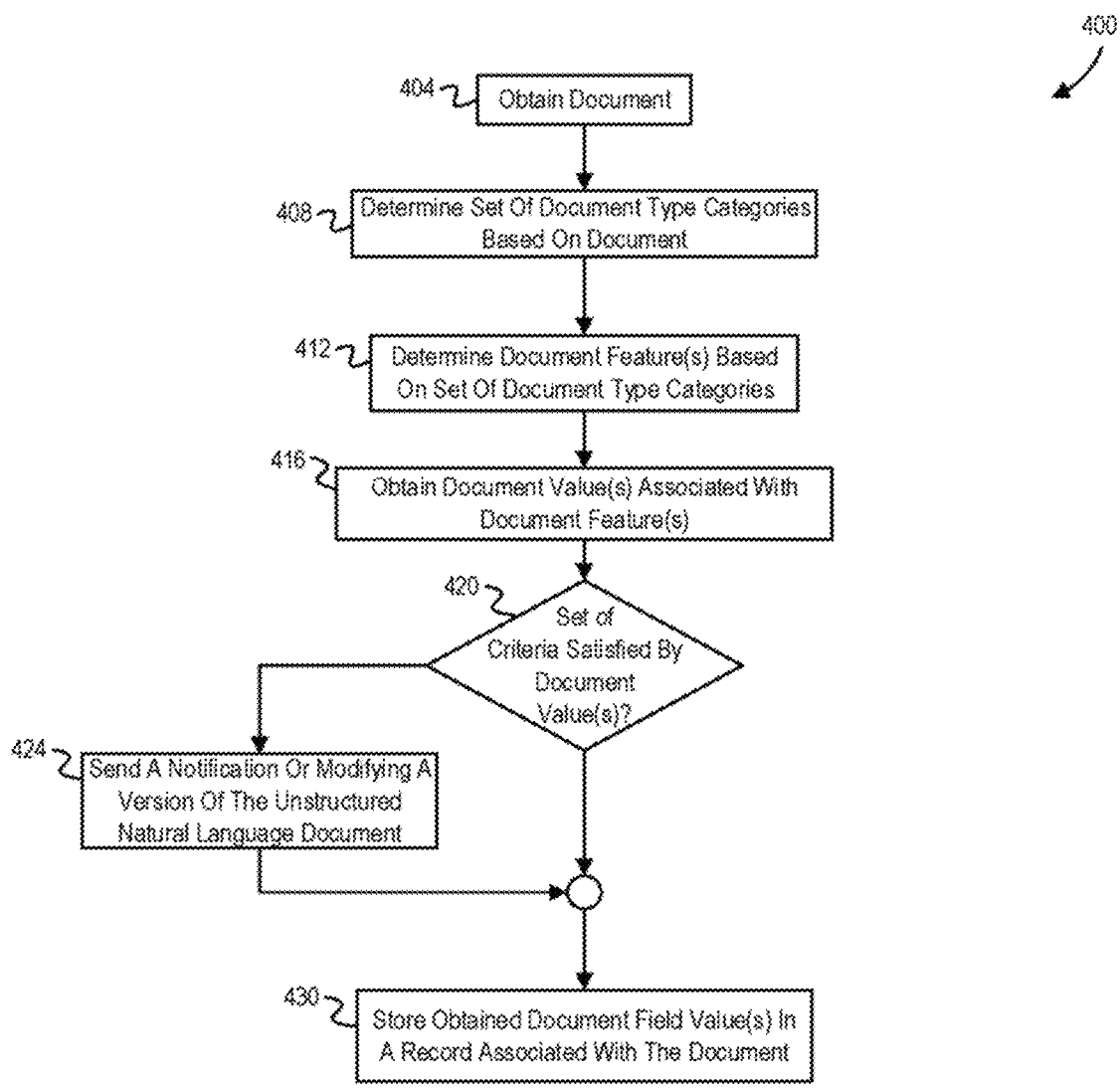
FIG. 4 is a flowchart diagram that illustrates a method of extracting information of a document in accordance with one or more embodiments of the present technique.

FIG. 4 is a flowchart diagram that illustrates a method (or "process") 400 of extracting information of a document in accordance with one or more embodiments of the present technique FIG. 4 is a flowchart diagram that illustrates a method of extracting information of a document in accordance with one or more embodiments of the present technique. In some embodiments, operations of the process 400 include obtaining a set of documents, as indicated by block 404. Obtaining the set of documents may include receiving corpora from a datastore, a user interface, an application program interface, or the like. For example, some embodiments may obtain the set of documents from a user via an upload from a user computing device. Various types of documents may be provided, such as plain text documents, PDF documents, Microsoft Word™ documents, or the like.

In some embodiments, operations of the process 400 include determining a set of document type categories based on the set of documents, as indicated for block 408. During the categorization of the set of documents, some embodiments may perform one or more document analysis or transformation operations to quantify different features of documents. For example, some embodiments may perform operations such as count vectorization (i.e., one-hot encoding), TF-IDF vectorization, or the like. For example, some embodiments may perform a set of TF-IDF operations to determine the relative importance of words of a document based on a plurality of documents. Some embodiments may then provide features obtained from these operations to one or more classifiers to classify a document with one or more document type categories. Various types of classifiers may be used, such as a random forest classifier, logistic regression classifier, naïve Bayes classifier, or the like. For example, some embodiments may provide a set of n-grams such as words, phrases, or symbols and their associated TF-IDF scores to a naïve Bayes classifier to determine that the document associated with the set of n-grams should be assigned the document type category "real estate contract."

In some embodiments, operations of the process 400 include obtaining a set of document feature associated with the set of document type categories, as indicated for block 412. Some embodiments may directly obtain a set of document features based on a document type category. Some embodiments may retrieve one or more rules from a rules engine or use other low-code or no-code engines to determine one or more features associated with a document. Some embodiments may retrieve the rules, values of the rules, or other information based on the set of document type categories assigned to the document using a document classifier described in this disclosure.

In some embodiments, operations of the process 400 include obtaining a set of document feature values associated with the set of document features, as indicated for block 416. Some embodiments may use a deep learning model to obtain the set of document feature values, where the set of document feature values may include numbers, words, symbols, hyperlinks, images, other media, or the like. In some embodiments, the deep learning model used to determine the set of document feature values may include a multi-channel transformer model, such as a Siamese BERT model or triplet network model. For example, some embodiments may use a Siamese BERT model to obtain a set of document feature values, where a first input for a first channel of the Siamese BERT model may include the set of document features associated with a set of document type classifiers, and where a second input for a second channel of the Siamese BERT model may include a set of document text.

Some embodiments may use a hierarchical set of deep learning models to extract document feature values. For example, some embodiments may use a first dual BERT or Siamese BERT model to assign priority scores to each sentence (or other text section) of a document with respect to a set of document features. Some embodiments may then provide each sentence that is assigned a priority score greater than a priority score threshold to a finer-grain deep learning model to determine a document feature value associated with a document feature. The finer-grain deep learning model may be another transformer model, such as another Siamese BERT model, or may be a different neural network model. In some embodiments, the finer-grain deep learning model may use one or more context parameters determined using other operations described in this disclosure, such as a priority score, a TF-IDF result, a category, or the like. For example, in an instance involving the following three sentences: (1) "The start date is 24 Apr. 2019", (2) "The end date is 24 Apr. 2022", and (3) "This document is signed by Mr. John Peter, if the system is attempting to identify a start date, all the three sentences may be ranked by the classifier based on the relevance score for start date. Sentence (1) may be ranked first/highest because it is determined to contain date information including a start date, sentence (2) may be ranked second because it is determined to contain date information, and sentence (3) may be ranked third/lowest because it is determined to have little to no relevance to the field (e.g., it is determined to not contain any date information). In such a scenario, sentence (1) may be processed first for the date extraction, based on it having the highest ranking and the start date results (e.g., "24 Apr. 2019") may be provided as the result for the start date field.

Some embodiments may determine a plurality of values for a document feature. For example, a first document feature may be labeled with the string "price." Some embodiments may use a trained deep learning model such as a trained Siamese BERT model to extract the value "30" in Association with the document feature "price" based on text of a first page of a document. Some embodiments may then use the same trained Siamese BERT model to extract the document feature value "40" in Association with the same document feature "price" based on text of a second page of a document. Some embodiments may store both instances of the document feature value in a record of the document. As described elsewhere in this disclosure, some embodiments may apply one or more rules to verify the different document feature values or identify a mismatch between the document feature values.

If a determination is made that the set of criteria is satisfied based on the set of document type values, operations of the flowchart 400 may proceed to operations described for block 424. Otherwise, operations of the flowchart 400 may proceed to operations described for block 430.

In some embodiments, operations of the process 400 include sending a notification or modifying a version of the unstructured natural language document, as indicated for block 424. Some embodiments may perform one or more actions based on the outcomes of whether or not the set of criteria are satisfied. In some embodiments, the actions may include providing one or more notifications to an end-user or otherwise in association with a document based on the criteria. Alternatively, or in addition, some embodiments may perform an automated action such as correcting a quantitative mismatch or indicating that one or more contract terms is rejected.

In some embodiments, operations of the process 400 include storing the set of obtained document feature values or other values in a record associated with the document, as indicated for block 430. For example, some embodiments may store the set of document feature values in a data lake. The values of the data lake may be used for various operations, such as additional training of one or more deep learning models, quantitative analysis, comparison to a set of criteria, or the like.

Example Micro-AI-Model Generation

Figure 5:
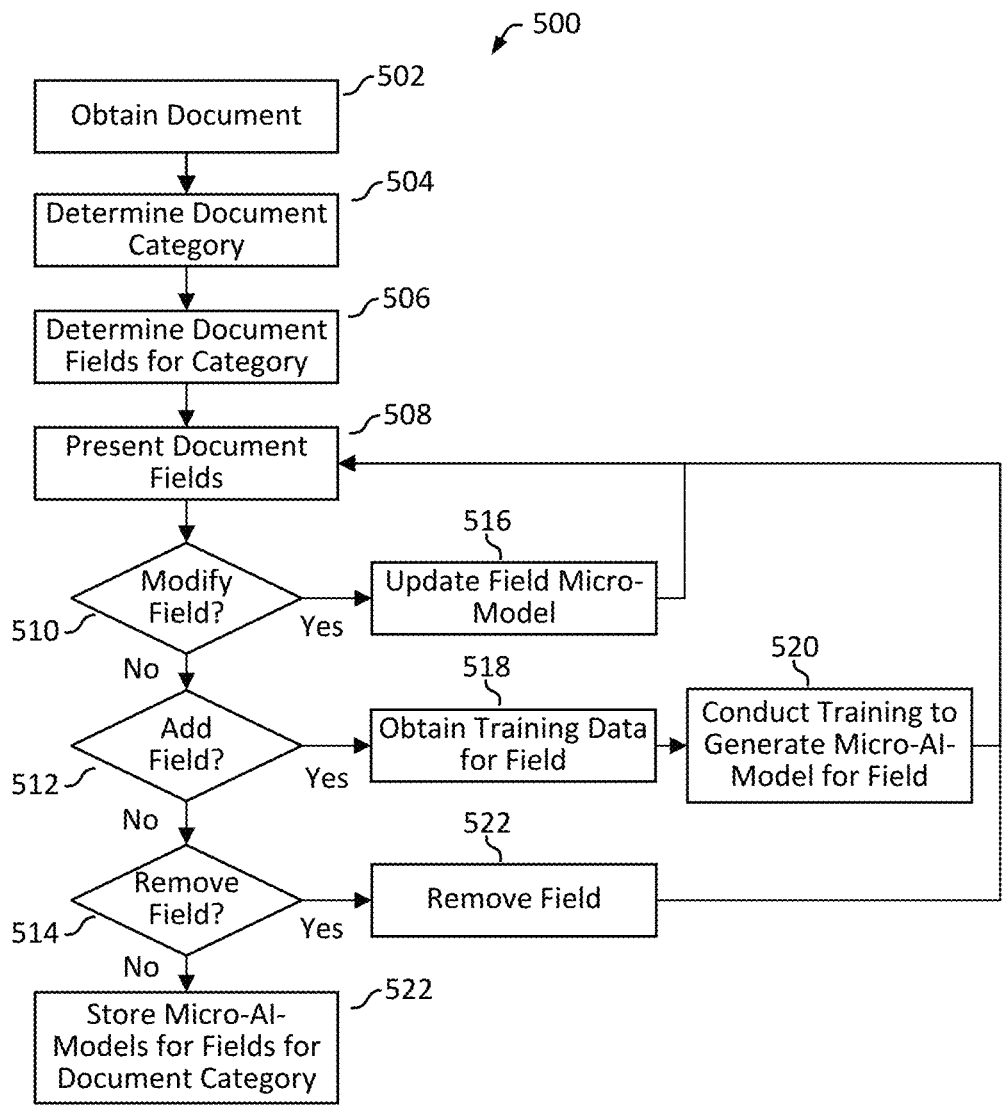
FIG. 5 is a flowchart diagram that illustrates a method employing micro-ai-models in accordance with one or more embodiments of the present technique.

FIG. 5 is a flowchart diagram that illustrates a method (or "process") 500 employing micro-ai-models in accordance with one or more embodiments of the present technique. The operations of method 500 may be performed, for example, by a NLP computer system, such as system 100.

In some embodiments, operations of the process 500 include obtaining a document, as indicated for block 502. This may include obtaining an unstructured natural language document having text sections including sequences of textual elements. For example, this may include a NLP computer system obtaining a document 202, as described here with regard to the document classifier 210. The document may be, for example, a real-estate contract having fields of "date" and "time" embedded in the text thereof.

In some embodiments, operations of the process 500 include determining a document category, as indicated for block 504. This may include conducting a classification operation to determine a category (or "classification") of the unstructured natural language document. Continuing with the prior example, this may include the NLP computer system (e.g., document classifier 210) conducting a classification operation (e.g., using first deep learning model 212) to determine that the document 202 is a real-estate contract.

In some embodiments, operations of the process 500 include determining document fields for a category for a document, as indicated for block 506. This may include conducting a field retrieving operation to determine one or more features (or "fields") associated with the category of the unstructured natural language document. Continuing with the prior example, this may include the NLP computer system (e.g., field retriever 220) conducting a field retrieving operation to determine that the fields "date" and "time" are associated with the real-estate contract document category.

In some embodiments, operations of the process 500 include presenting document fields for a document, as indicated for block 508. This may include presenting a listing of the features (or "fields") associated with the category of the unstructured natural language document. Continuing with the prior example, this may include the NLP computer system (e.g., field editor 232 of the interface 230 of the field retriever 220) displaying on a graphical user interface for viewing and selection by a user, a listing the fields "date" and "time" determined to be associated with the real-estate contract document category. The listing of fields may be interactive, allowing a user to select to modify a displayed field, select to add a field to the listing, or select to delete a field from the listing.

In response to receiving a user selection to modify a field of the listing (block 510), the process 500 may proceed to updating the associated field micro-ai-model. For example, in response to the NLP computer system (e.g., field editor 232 of the interface 230 of the field retriever 220) receiving a request to edit the field "date" to "day," the NLP computer system (e.g., field editor 232) may update the micro-ai-model 236 (stored in datastore 242) currently associated with "date" to be associated with "day," such that values extracted using the micro-ai-model 236 are labeled as "day" as opposed to "date."

In response to receiving a user selection to add a field to the listing (block 512), the process 500 may proceed to obtaining training data for the field (block 518) and conducting corresponding training (block 520) (e.g., using the obtained training data) to generate a micro-ai-model for the field to be added. For example, in response to the NLP computer system (e.g., field editor 232) receiving a request to add the field "purchaser," the NLP computer system (e.g., field editor 232) may prompt the user to provide the field name and to upload relevant field training data 234 for the field. The field training data 234 for the field may, for example, include "positive samples" including document text containing names of purchasers, and a listing of the names of the purchasers for use in training a "purchaser" micro model 236. In response to receiving the field training data 234, the NLP computer system (e.g., field editor 232) may conduct a training operation (block 520) to generate a micro-ai-model 236 for the "purchaser" field (or "term"), and the "purchaser" micro-ai-model 236 may be stored in the datastore 242 for use in extracting values for the "purchaser" field.

In response to receiving a user selection to remove a field of the listing (block 514), the process 500 may proceed to removing the associated field (block 522). For example, in response to the NLP computer system (e.g., field editor 232) receiving a request to remove the field "time," the NLP computer system (e.g., field editor 232) may remove the field from the association with real-estate contract type documents and delete a "time" micro-ai-model 236 (from the datastore 242). Thus, the associated listing of features may not include "time" such that values for "time" will not be extracted from the real estate document. And, the next time a real-estate document is encountered, "time" will not be listed as an associated feature, and values for "time" will not be extracted from the real estate document.

In some embodiments, operations of the process 500 include storing micro-ai-models for fields for the document category, as indicated for block 522. This may include storing the added and modified micro-ai-models for use in extracting values from the document. Continuing with the prior example, this may include the NLP computer system (e.g., field editor 232) storing the modified "day" micro-ai-model and the new "purchaser" micro-ai-model in datastore 242.

Example Micro-AI-model Extraction

Figure 6:
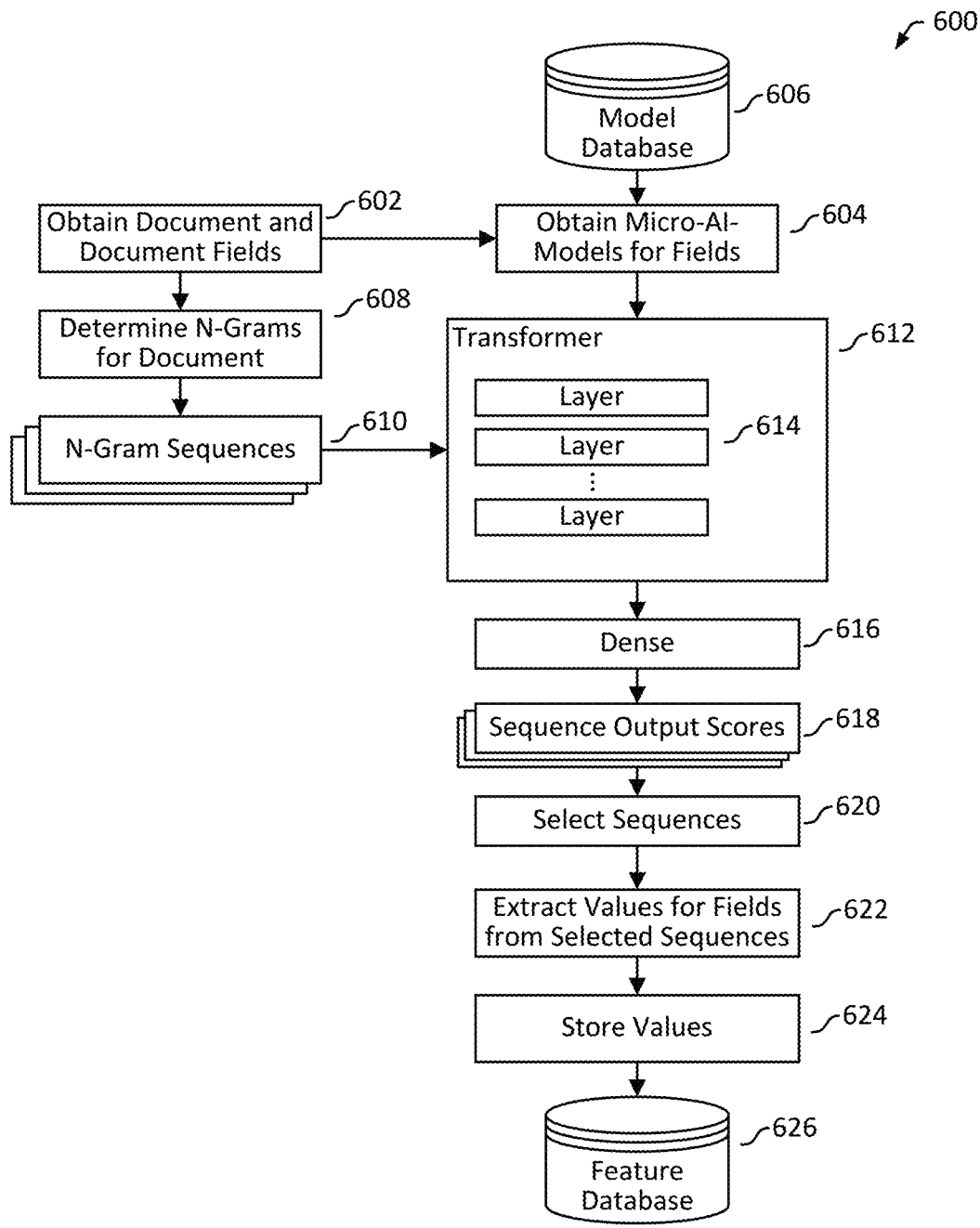
FIG. 6 is a flowchart diagram that illustrates employing micro-ai-models in accordance with one or more embodiments of the present technique.

FIG. 6 is a diagram that illustrates a method (or "process") 600 of employing micro-ai-models in accordance with one or more embodiments of the present technique. The operations of method 600 may be performed, for example, by a NLP computer system, such as system 100.

In some embodiments, operations of the process 600 include obtaining documents and document fields, as indicated for block 602. This may include obtaining an unstructured natural language document having text sections including sequences of textual elements, and an identification of features (or "fields") associated with the document. Continuing with the prior example, this may include the NLP computer system (data extraction deep learning model 240) receiving (as a result of categorization and field retrieving operations), the real-estate document and a listing of the fields "day" and "purchaser."

In some embodiments, operations of the process 600 include obtaining micro-ai-models for document fields, as indicated for block 604. This may include obtaining a micro-ai-model associated with each of the features (or "fields") associated with a document. Continuing with the prior example, this may include the NLP computer system (data extraction deep learning model 240) retrieving, from a model database 606 (e.g., the datastore 242), the "day" micro-ai-model 236 and the "purchaser" micro-ai-model 236.

In some embodiments, operations of the process 600 include determining n-grams for the document, as indicated for block 608, and associated n-gram sequences, as indicated for block 610. This may include determining n-gram of the document and assembling them into a set of n-gram sequences for the document. Continuing with the prior example, this may include the NLP computer system (data extraction deep learning model 240) determining n-gram of the document and corresponding n-gram sequences that are sentences (or similar phrases) contained in the real-estate contract.

In some embodiments, operations of the process 600 include, for each field, providing to a transformer (612), the corresponding micro-ai-model for the document field and the n-gram sequences for use in determining, for each of the fields, scores for each of the n-gram sequences. Continuing with the prior example, in a first iteration, the "day" micro-ai-model 236 and the sentences of the real-estate contract may be provided to the transformer 612 to generate a set of sequence output scores (block 618) that reflects the relevance of each sentence to the "day" field (e.g., a score for each sentence that indicates how likely the sentence is to contain a value for the "day" field). In a second iteration, the "purchaser" micro-ai-model 236 and the sentences of the real-estate contract may be provided to the transformer 612 to generate a set of sequence output scores (block 618) that reflect the relevance of each sentence to the "purchaser" field (e.g., a score for each sentence that indicates how likely the sentence is to contain a value for the "purchaser" field). This may include the NLP computer system (data extraction deep learning model 240) determining n-gram sequences that are sentences (or similar phrases) contained in the real-estate contract. The transformer may, for example, employ multiple layers (614) (as described here) to apply the given micro-ai-model to the input n-gram sequences to generate the sets of sequence output scores (block 618). The output of the layer (614) may be provided to a dense layer (616) that provides the sets of sequence output scores (block 618). The dense layer (616) may be, for example, a fully connected linear layer of the neural networks.

In some embodiments, operations of the process 600 include selecting sequences, as indicated for block 620. This may include selecting, for each field, n-gram sequences associated with a score that satisfies a threshold. Continuing with the prior example, this may include the NLP computer system (data extraction deep learning model 240) determining, from the sequence output scores for the "day" field, a given number of the sentences with the highest score or the sentences having a score above a given minimum threshold score. A similar process may be conducted for each of the other document fields.

In some embodiments, operations of the process 600 include extracting values for the fields from the selected sequences, as indicated for block 624, and storing those values, as indicated at block 624. This may include, for each field, conducting an extraction operation on the selected sequences for the field to determine field values therefore, and storing those values. Continuing with the prior example, this may include the NLP computer system (data extraction deep learning model 240) applying, to the set of sentences selected for the "day" field, a data extraction model for the term "day" (e.g., a mico-ai-model 236 for the field/term day) to extract values for the field "day" from the real-estate contract. A similar process may be conducted for each of the other document fields. The extracted values (e.g., for "day," "purchaser," and so forth) may be stored in the database 262.

Example Computing Device

Figure 7:
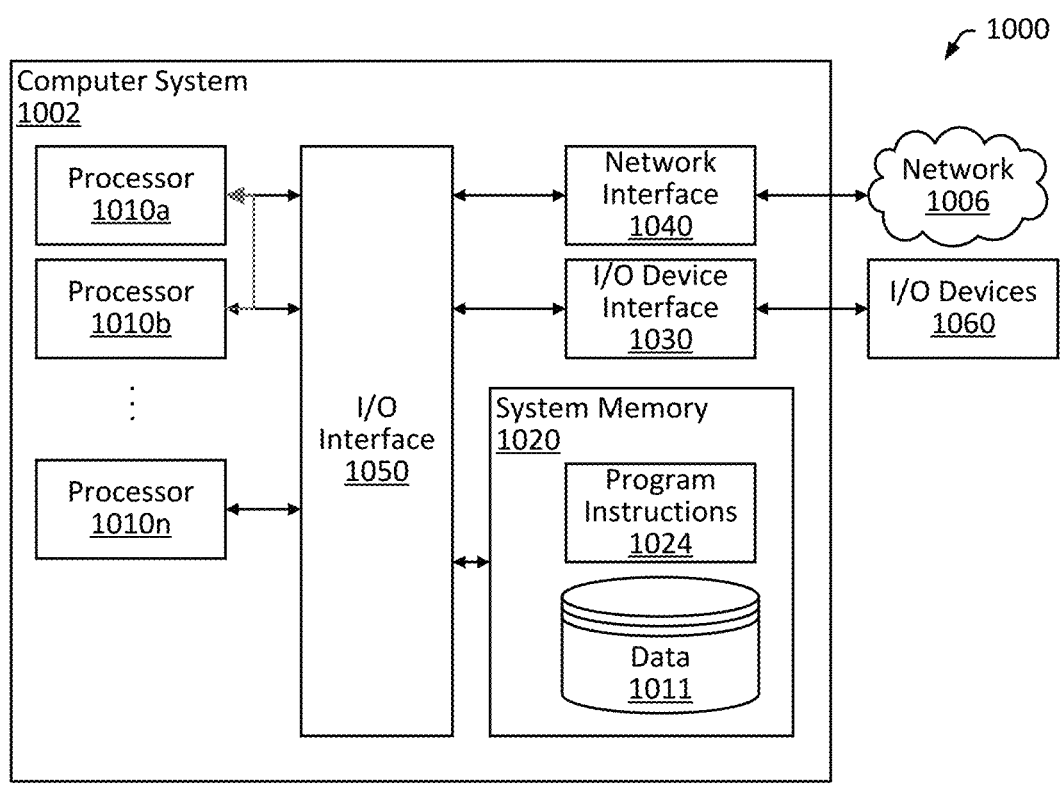
FIG. 7 is a diagram that illustrates an example computing device in accordance with one or more embodiments of the present technique.

FIG. 7 is a diagram that illustrates an example computing device in accordance with one or more embodiments of the present technique. FIG. 7 is a diagram that illustrates an example computing device 1000 in accordance with one or more embodiments of the present technique. Various portions of systems and methods described herein, may include or be executed on one or more computer systems similar to computer system 1000. Further, processes and modules described may be executed by one or more processing systems similar to that of computer system 1000.

Computer system 1000 may include one or more processors (e.g., processors 1010*a*-1010*n*) coupled to System memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 1020). Computer system 1000 may be a uniprocessor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1024 or data 1011. Program instructions 1024 may be executable by a processor (e.g., one or more of processors 1010*a*-1010*n*) to implement one or more embodiments of the present techniques. Program instructions 1024 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory, computer-readable storage medium that may have program instructions stored thereon that are executable by a computer processor (e.g., one or more of processors 1010*a*-1010*n*) to cause the subject matter and the functional operations described herein. A memory (e.g., System memory 1020) may include a single memory device and/or a plurality of memory devices (e.g., distributed memory devices). Instructions or other program code to provide the functionality described herein (such as the functions of the system 100) may be stored on a tangible, non-transitory, computer-readable media. The instructions may be executable by a computer processor to cause the associated operations to be performed. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, System memory 1020, network interface 1040, I/O devices 1060, and/or other peripheral devices. I/O interface 1050 may perform protocol, timing, or other data transformations to convert data signals from one component (e.g., System memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The word "set" when used as a noun include a single item or a plurality of items, such that the phrase "set of items" may refer to either a single item or multiple items. The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Some embodiments may include text navigation indicators or other context values to indicate where one or more document type values is located in a document or verify the validity of an obtained document type value. For example, some embodiments may use a document classifier to determine that a first document has a document type of "Type01A" and a corresponding document feature of "effective date." The value for the document feature "effective date" may be stored in a first text section having the header "date listing." Some embodiments may perform one or more operations described in this disclosure on the first text section to retrieve a corresponding document feature value for the document feature "effective date" from the first text section using a Siamese BERT model. As described elsewhere in this disclosure, the relative sparsity of contract data may make dual input learning models such as the Siamese BERT model useful.

Some embodiments may apply a hierarchical set of deep learning models to obtain document feature values or other values of a document based on their corresponding types of values. For example, after using a first deep learning model to obtain a first set of document feature values, some embodiments may use a second deep learning model to obtain a second set of document feature values. The first set of document feature values may be a set of quantities, and the second set of document feature values may be a set of strings. Furthermore, some embodiments may obtain a set of pre-trained deep learning models using transfer learning techniques, where the set of pre-trained deep learning models may be further updated based on new feedback indicating whether one or more predicted values is correct.

As described elsewhere in this disclosure, some embodiments may use learning model parameters that are cached on a local computing device to perform one or more data extraction operations. For example, some embodiments may push a set of learning model parameters to a user computing device and then, after receiving a request to perform a data extraction operation, some embodiments may instruct the user computing device to extract data from a document based on the set of learning model parameters. Alternatively, or in addition, some embodiments may use learning model parameters that are stored in a fast cache, where the speed of data access with respect to the cash may be greater relative to a speed of data access for a persistent storage used to store documents. For example, some embodiments may obtain model parameters from a Redis datastore.

In some embodiments, operations of the process 400 may include determining whether a set of criteria is satisfied based on the set of document type values, as indicated for block 420. In some embodiments, one or more rules may be used to verify or otherwise validate field values obtained from a document. For example, some embodiments may apply a first set of rules associated with a first document type to a set of obtained field values, where the first set of rules. Some embodiments may apply a plurality of rules based on a document type category. For example, based on a determination that a document has a document type category of "transaction contract," some embodiments may apply a set of rules to check whether a corresponding set of obtained document feature values includes values that populate a first field titled "supplier," a second field titled "payment," or other fields of a corresponding set of document features. Various other rules may be applied, such as a rule that a set of compliance checks are satisfied, a set of conditions indicating non-suspicious activity is satisfied.

In some embodiments, different sets of criteria may be applied. For example, a first set of criteria may include a set of criteria indicating data quality, where criteria may include determining whether a first set of fields titled "required" has been populated with an associated set of field values or whether a set of derived field values have been determined. The set of criteria may also include determining whether the set of field values is cross-validated with other data, whether a set of ranges associated with one or more fields satisfy a corresponding range threshold, whether the source of the document being analyzed is listed as an accepted data source, or the like. A second set of rules may include a set of compliance rules corresponding with an account record or a group of account records identifying or otherwise associated with an organization. For example, the second set of rules may determine whether the field values indicate duplicate payment or invoices, duplicate purchase numbers for a same item, or the like. In some embodiments the set of rules being applied to a document may be specific to a document type, where a determination may be made about whether a document is actually of the document type (e.g., a document is identified by a set of headers or vocabulary as a contract), whether a document identifier is correct, whether a set of document feature values is present or within a range of known acceptable values, or the like. For example, some embodiments may determine whether a document has features associated with a document type "contract," whether the document has a correct identifier, whether the document lists either no discount or an incorrect discount value, or the like. Some embodiments may further determine reconciliation rules, where the reconciliation rules may include determining mismatches in quantity, price, or other numeric values.

Certain embodiments include a method for storing values in association with an unstructured natural language document. The method including: obtaining an unstructured natural language document including one or more text sections; determining a count of n-grams of the unstructured natural language document; determining, based on the count of n-grams of the unstructured natural language document, a vector for the document; determining, based on the vector using a first machine learning model, a category for the document; retrieving, based the category, a set of features for the document; determining, based on the set of features and text of the unstructured natural language document with a second machine learning model, a score for a text section of the unstructured natural language document; selecting, based on the score, the text section; obtaining, based on the selection of text section, a feature value; and storing the feature value in association with the unstructured natural language document. In some embodiments, the first machine learning model includes a first deep learning model, and the second machine learning model includes a second deep learning model. In some embodiments, the second machine learning model includes a multi-channel transformer, and determining the score includes: providing the set of features to a first channel of the multi-channel transformer; and providing the text of the unstructured natural language document to a second channel of the multi-channel transformer. In some embodiments, the unstructured natural language document includes a contract document outlining contract terms, and the feature value includes a numerical value for one or more of the contract terms, with the method further including generating, based on the contract term, a second contract, wherein the second contract includes a self-executing contract including computer code defining the contract terms and configured to be executed to enforce the contract terms.

What is claimed is:

1. A method of natural language processing (NLP) of an unstructured natural language document, the method comprising:

obtaining, by a NLP computer system, an unstructured natural language document, the unstructured natural language document comprising text sections comprising sequences of textual elements;

determining, by the NLP computer system, n-grams corresponding to the sequences of textual elements;

determining, by the NLP computer system and based on the n-grams, a vector of the unstructured natural language document;

determining, by the NLP computer system and based on application of the vector to a category model configured to determine a category for a document based on a vector of the document, a category for the unstructured natural language document;

determining, by the NLP computer system responsive to determining the category for the unstructured natural language document, a set of document features comprising two or more document features associated with the category;

determining, by the NLP computer system, for each of the two or more document features associated with the category, a feature value for the document feature, comprising:

determining, by the NLP computer system, a feature model corresponding to the document feature of the set of document features;

determining, by the NLP computer system based on application of the feature model to a text section of the text sections of the unstructured natural language document, a feature score for the text section;

selecting, by the NLP computer system based on the feature score, the text section;

determining, by the NLP computer system responsive to the selection of the text section based on the score, a feature value for the document feature based on contents of the text section;

a first feature value is determined for a given document feature of the set of document features based on contents of a first text section and a second feature value is determined for the given document feature based on contents of a second text section;

determining, by the NLP computer system based on application of reconciliation rules, a value for the given document feature based on the first and second feature values for the given document feature;

generating, by the NLP computer system based on the two or more feature values determined for the two or more document features of the set of document features, a self-executing contract comprising contract terms corresponding to the two or more document features, the self-executing contract comprising computer code comprising conditional statements defining the contract terms corresponding to the one more feature values determined; and storing, on a distributed ledger peer-to peer-network, the computer code comprising the conditional statements defining the contract terms, the computer code stored on the distributed ledger peer-to peer-network being executable to enforce the conditional statements defining the contract terms.

2. The method of claim 1, wherein the feature model comprises a micro-ai-model associated with the document feature.

3. The method of claim 1, wherein determining the feature score for a text section comprises a transformer applying the feature model to n-grams corresponding to the text section.

4. The method of claim 1, wherein the feature value comprises a numerical value.

5. The method of claim 1, wherein determining the vector of the unstructured natural language document comprises determining, using term frequency-inverse document frequency (TF-IDF) scoring based on a count of the n-grams, the vector of the unstructured natural language document.

6. The method of claim 1, wherein the computer code is executed to enforce the contract terms.

7. The method of claim 6, wherein the self-executing contract defines an exchange of monetary funds in response to occurrence of an event, and wherein the execution of the computer code causes the exchange of the monetary funds in response to occurrence of the event.

8. The method of claim 1, wherein the computer code stored on the distributed ledger peer-to peer-network is executed to enforce the contract terms.

9. The method of claim 8, wherein the self-executing contract defines an exchange of monetary funds in response to occurrence of an event, and wherein the execution of the computer code stored on the distributed ledger peer-to peer-network causes the exchange of the monetary funds in response to occurrence of the event.

10. The method of claim 1, wherein the unstructured natural language document comprises a contract document outlining contract terms corresponding to the feature value.

11. A system for natural language processing (NLP) of an unstructured natural language document, the system comprising:

a computer processor; and non-transitory computer readable storage medium comprising program instructions stored thereon that are executable by the computer processor to cause the following operations:

obtaining, by a NLP computer system, an unstructured natural language document, the unstructured natural language document comprising text sections comprising sequences of textual elements;

determining, by the NLP computer system, n-grams corresponding to the sequences of textual elements;

determining, by the NLP computer system and based on the n-grams, a vector of the unstructured natural language document;

determining, by the NLP computer system based on application of the vector to a category model configured to determine a category for a document based on a vector of the document, a category for the unstructured natural language document;

determining, by the NLP computer system responsive to determining the category for the unstructured natural language document, a set of document features comprising two or more document features associated with the category;

determining, by the NLP computer system, for each of the two or more document features associated with the category, a feature value for the document feature, comprising:

determining, by the NLP computer system, a feature model corresponding to the document feature of the set of document features;

determining, by the NLP computer system based on application of the feature model to a text section of the text sections of the unstructured natural language document, a feature score for the text section;

selecting, by the NLP computer system based on the feature score, the text section;

determining, by the NLP computer system responsive to the selection of the text section based on the score, a feature value for the document feature based on contents of the text section;

a first feature value is determined for a given document feature based on contents of a first text section and a second feature value is determined for the given document feature based on contents of a second text section;

determining, by the NLP computer system based on application of reconciliation rules, a value for the given document feature based on the first and second feature values for the given document feature;

generating, by the NLP computer system based on the one more feature values determined for the one or more document features of the set of document features, a self-executing contract comprising contract terms corresponding to the two or more document features, the self-executing contract comprising computer code comprising conditional statements defining the contract terms corresponding to the one more feature values determined; and storing, on a distributed ledger peer-to peer-network, the computer code comprising the conditional statements defining the contract terms, the computer code stored on the distributed ledger peer-to peer-network being executable to enforce the conditional statements defining the contract terms.

12. The system of claim 11, wherein the feature model comprises a micro-ai-model associated with the document feature.

13. A non-transitory computer readable storage medium comprising program instructions stored thereon that are executable by the computer processor to cause the following operations for natural language processing (NLP) of an unstructured natural language document:

obtaining, by a NLP computer system, an unstructured natural language document, the unstructured natural language document comprising text sections comprising sequences of textual elements;

determining, by the NLP computer system, n-grams corresponding to the sequences of textual elements;

determining, by the NLP computer system and based on the n-grams, a vector of the unstructured natural language document;

determining, by the NLP computer system and based on application of the vector to a category model configured to determine a category for a document based on a vector of the document, a category for the unstructured natural language document;

determining, by the NLP computer system responsive to determining the category for the unstructured natural language document, a set of document features comprising two or more document features;

determining, by the NLP computer system, for each of the two or more document features associated with the category, a feature value for the document feature, comprising:

determining, by the NLP computer system, a feature model corresponding to the document feature of the set of document features;

determining, by the NLP computer system based on application of the feature model to a text section of the text sections of the unstructured natural language document, a feature score for the text section;

selecting, by the NLP computer system based on the feature score, the text section;

determining, by the NLP computer system responsive to the selection of the text section based on the score, a feature value for the document feature based on contents of the text section;

a first feature value is determined for a given document feature based on contents of a first text section and a second feature value is determined for the given document feature based on contents of a second text section;

determining, by the NLP computer system based on application of reconciliation rules, a value for the given document feature based on the first and second feature values for the given document feature;

generating, by the NLP computer system based on the two more feature values determined for the two or more document features of the set of document features, a self-executing contract comprising contract terms corresponding to the two or more document features, the self-executing contract comprising computer code comprising conditional statements defining the contract terms corresponding to the one more feature values determined; and storing, on a distributed ledger peer-to peer-network, the computer code comprising the conditional statements defining the contract terms, the computer code stored on the distributed ledger peer-to peer-network being executable to enforce the conditional statements defining the contract terms.

14. The medium of claim 13, wherein the feature model comprises a micro-ai-model associated with the document feature.

* * * * *